(12) United States Patent
Roth

(10) Patent No.: US 12,271,777 B2
(45) Date of Patent: Apr. 8, 2025

(54) SYSTEMS AND METHODS FOR USING RFID TECHNOLOGY TO IDENTIFY PRODUCTS

(71) Applicant: Avery Dennison Retail Information Services LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 131 days.

(21) Appl. No.: 18/006,994

(22) PCT Filed: Aug. 11, 2021

(86) PCT No.: PCT/US2021/045618
§ 371 (c)(1),
(2) Date: Jan. 26, 2023

(87) PCT Pub. No.: WO2022/036011
PCT Pub. Date: Feb. 17, 2022

(65) Prior Publication Data
US 2023/0274109 A1    Aug. 31, 2023

Related U.S. Application Data

(60) Provisional application No. 63/064,364, filed on Aug. 11, 2020.

(51) Int. Cl.
*G06K 7/10* (2006.01)
(52) U.S. Cl.
CPC ................ *G06K 7/10366* (2013.01)
(58) Field of Classification Search
CPC ........... G06K 7/10316; G06K 7/10425
(Continued)

(56) References Cited

U.S. PATENT DOCUMENTS 10,783,339 B2   9/2020  Markman et al.
11,893,563 B2*  2/2024  Kumagawa ........ G06K 7/10108
(Continued)

FOREIGN PATENT DOCUMENTS

WO   2009/029595   3/2009
WO   2019/150733   8/2019

OTHER PUBLICATIONS

International Search Report and Written Opinion dated Jan. 27, 2022 issued in corresponding IA No. PCT/US2021/045618 filed Aug. 11, 2021.
(Continued)

*Primary Examiner* — Paultep Savusdiphol

(57) ABSTRACT

In some embodiments, an RFID system for product identification may include a compartment having a first wall and a second wall that extend toward each other and that together define at least part of a cavity and a channel. The cavity may extend laterally along a first direction and may be configured to contain a suspended package and having a first width may extend along a second direction. The channel may extend laterally along the first direction and having a second width may extend along a second direction, the channel being in fluid communication with the cavity, the channel may be configured to limit movement along the second direction of a support that extends downward through the channel and into the cavity to support the suspended package, the second width of the channel being narrower than the first width of the cavity.

15 Claims, 13 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2006/0170556 A1 | 8/2006 | Fang | |
| 2008/0116274 A1* | 5/2008 | Aldridge | ................ D06F 93/00 |
| | | | 235/440 |
| 2009/0101713 A1 | 4/2009 | Ulrich et al. | |
| 2012/0280040 A1* | 11/2012 | Carney | ................ G06Q 20/047 |
| | | | 235/383 |
| 2019/0156317 A1* | 5/2019 | Kawamoto | ........... G06Q 20/208 |
| 2019/0205582 A1* | 7/2019 | Roth | ................... G06K 7/10445 |
| 2019/0213572 A1* | 7/2019 | Imamura | ............ G06K 7/10366 |
| 2021/0073487 A1* | 3/2021 | Saegusa | ................... H04B 5/77 |
| 2021/0150505 A1* | 5/2021 | Kumagawa | ............ G06Q 30/06 |
| 2021/0248879 A1* | 8/2021 | Khojastepour | ........ G07G 1/009 |
| 2022/0004723 A1 | 1/2022 | Suzuki | |

OTHER PUBLICATIONS

International Preliminary Report on Patentability dated Feb. 7, 2023 issued in corresponding IA No. PCT/US2021/045618 filed Aug. 11, 2021.

Walk-through RFID Checkout Solution & Smart Cameras, video viewed May 27, 2024, https://www.youtube.com/watch?v=TF8HAhUN_p4, published Feb. 21, 2018.

* cited by examiner

SYSTEMS AND METHODS FOR USING RFID TECHNOLOGY TO IDENTIFY PRODUCTS

CROSS-REFERENCE TO RELATED APPLICATION(S)

The present application is a 371 of International Application No. PCT/US2021/045618 which was published in English on Feb. 17, 2022, and claims the benefit of U.S. Provisional Patent Application 63/064,364 filed Aug. 11, 2020, both of which are incorporated herein by reference in their entireties.

BACKGROUND

1. Field of Invention

The present invention relates to systems and methods for using RFID technology to identify products, and more specifically, to systems and methods that enable faster identification of multiple products.

2. Description of Related Art

The retail environment is going through a dramatic transformation. Traditional brick and mortar operations are having to innovate to retain or capture market share, which can be improved through frictionless or faster checkout.

Barcode scanning, which remains in primary use for individual item scanning at checkout, typically involves limitations that increase time and reduce efficiency. For example, each item is typically handled individually by the cashier, a customer, or both. Each item may be picked up by a person from a basket, cart, or bag, displayed visually one or more times to a barcode scanner, and then placed into a bag for removal from the store. The more items there are to process, the more time it takes for the cashier or customer to pick up each item, successfully perform a visual scan, and collect the scanned items for bagging.

In some other conventional systems, an RFID reader may be used to identify nearby RFID transponders. However, such systems may have a substantial risk of incurring false reads from nearby unrelated RFID transponders. For example, if additional power is used to energize all transponders within a container, conventional systems may cause nearby RFID transponders to be energized and read, resulting in false charges. These in turn may cause a loss of goodwill for the business. Thus, a continuing need exists for systems and methods that enable faster and more efficient identification of products.

SUMMARY

The present invention relates to systems and methods for using RFID technology to identify products, and more specifically, to systems and methods that enable faster identification of multiple products.

In some embodiments, an RFID system for product identification may include a compartment having a first wall and a second wall that extend toward each other and that together define at least part of a cavity and a channel. The cavity may extend laterally along a first direction and may be configured to contain a suspended package and having a first width may extend along a second direction. The channel may extend laterally along the first direction and having a second width may extend along a second direction, the channel being in fluid communication with the cavity, the channel may be configured to limit movement along the second direction of a support that extends downward through the channel and into the cavity to support the suspended package, the second width of the channel being narrower than the first width of the cavity.

In some embodiments, at least one RFID antenna may be configured to transmit a signal to be received by the at least one RFID transponder of the suspended package. An RFID reader may be configured to interpret an output from the at least one RFID transponder disposed in the cavity. The width of the channel may be less than 6 inches.

In some embodiments, the first wall may include a first lower edge that may be distal to the first edge, and the second wall may include a second lower edge that may be distal to the second edge. The system may include a base connected to the first lower edge and the second lower edge. The at least one RFID antenna may be an NFC antenna. The first wall and the second wall may define a first lateral opening that permits lateral movement of the suspended package between the cavity and space external to the compartment. The first wall and the second wall may define a second lateral opening that permits lateral movement of the suspended package between the cavity and space external to the compartment.

In some embodiments, the system may include a third wall that may be separated from the first and second wall and positioned to at least partially block lateral line of sight to the RFID reader from outside the compartment and through the first lateral opening. The third wall may be formed from at least one of a door and a cloth. The system may include a third wall that may be separated from the first and second wall and positioned to at least partially block lateral line of sight to the RFID reader from outside the compartment and through the first lateral opening, and a fourth wall that may be separated from the first and second wall and positioned to at least partially block lateral line of sight to the RFID reader from outside the compartment and through the second lateral opening. The third wall and the fourth wall may be each formed from at least one of a door and a cloth.

In some embodiments, the first lateral opening and the second lateral opening may be disposed opposite each other. One or more of the second opening and the third opening may enable the suspended package to move along the first lateral direction into the cavity. One or more of the second opening and the third opening may enable the suspended package to move along a second lateral direction into the cavity. At least one of the first wall and the second wall may be curved.

In some embodiments, the system may include a first reflector disposed within the cavity and facing the RFID antenna and the RFID reader. The system may include a second reflector disposed within the cavity and facing the RFID antenna. The system may include a sensor configured to trigger operation of at least one of the RFID reader and the RFID antenna. The system may include a display. The second wall may be taller than the first wall. The RFID reader and the RFID antenna may be mounted in the second wall.

In some embodiments, the system may include a first reflector mounted on the first wall and facing the cavity. The system may include a second reflector mounted on the second wall and facing the cavity. Each of the first wall and the second wall may include a protrusion that may extend laterally along a second direction toward the opposite wall, the channel being defined by the pair of protrusions.

In some embodiments, a method of identifying products using an RFID system may include a compartment having a first wall and a second wall that together define at least part of a cavity and a channel, may include receiving a suspended package in the cavity of the compartment of the RFID system, using the first wall and the second wall that define the channel, guiding lateral movement of a support that extends downward through the channel and into the cavity to support the suspended package, transmitting a signal to be received by at least one RFID transponder of the suspended package using at least one RFID antenna and using an RFID reader, interpreting an output from the at least one RFID transponder disposed in the cavity. The cavity may extend laterally along a first direction and may be configured to contain a suspended package, and the channel may extend laterally along the first direction and may be in fluid communication with the cavity. The width of the channel may be less than 6 inches.

In some embodiments, the first wall may include a first lower edge that may be distal to the first edge, and the second wall may include a second lower edge that may be distal to the second edge. The compartment further may include a base connected to the first lower edge and the second lower edge. The at least one RFID antenna may be an NFC antenna. The first wall and the second wall may define a first lateral opening that permits lateral movement of the suspended package between the cavity and space external to the compartment. The first wall and the second wall define a second lateral opening that permits lateral movement of the suspended package between the cavity and space external to the compartment. The compartment may include a third wall that may be separated from the first and second wall and positioned to at least partially block lateral line of sight to the RFID reader from outside the compartment and through the first lateral opening. The third wall may be formed from at least one of a door and a cloth.

In some embodiments, the compartment further may include a third wall that may be separated from the first and second wall and positioned to at least partially block lateral line of sight to the RFID reader from outside the compartment and through the first lateral opening and a fourth wall that may be separated from the first and second wall and positioned to at least partially block lateral line of sight to the RFID reader from outside the compartment and through the second lateral opening. The third wall and the fourth wall may be each formed from at least one of a door and a cloth.

In some embodiments, the first lateral opening and the second lateral opening may be disposed opposite each other. One or more of the second opening and the third opening may enable the suspended package to move along the first lateral direction into the cavity. One or more of the second opening and the third opening enable the suspended package to move along a second lateral direction into the cavity. At least one of the first wall and the second wall may be curved. A first reflector may be disposed within the cavity and facing the RFID antenna and the RFID reader. A second reflector may be disposed within the cavity and facing the RFID antenna. The system may include a sensor configured to trigger operation of at least one of the RFID reader and the RFID antenna. The compartment further may include a display.

In some embodiments, the second wall may be taller than the first wall. The RFID reader and the RFID antenna may be mounted in the second wall. The compartment may include a first reflector mounted on the first wall and facing the cavity. The compartment may include a second reflector mounted on the second wall and facing the cavity. Each of the first wall and the second wall may include a protrusion that may extend laterally along a second direction toward the opposite wall, the channel being defined by the pair of protrusions.

In some embodiments, a method of forming an RFID system for product identification may include forming a compartment having a first wall and a second wall that together define at least part of a cavity and a channel. The cavity may extend laterally along a first direction and may be configured to contain a suspended package. The channel may extend laterally along the first direction and being in fluid communication with the cavity, the channel may be configured to guide lateral movement of a support that extends downward through the channel and into the cavity to support the suspended package. The method may include configuring at least one RFID antenna to transmit a signal to be received by the at least one RFID transponder of the suspended package and configuring an RFID reader to interpret an output from the at least one RFID transponder disposed in the cavity, and the width of the channel may be less than 6 inches.

BRIEF DESCRIPTION OF THE DRAWINGS

The objects, features and advantages of the present disclosure will be apparent from the following detailed descriptions of the various aspects of the invention in conjunction with reference to the following drawings, where.

DETAILED DESCRIPTION

Figure 1:
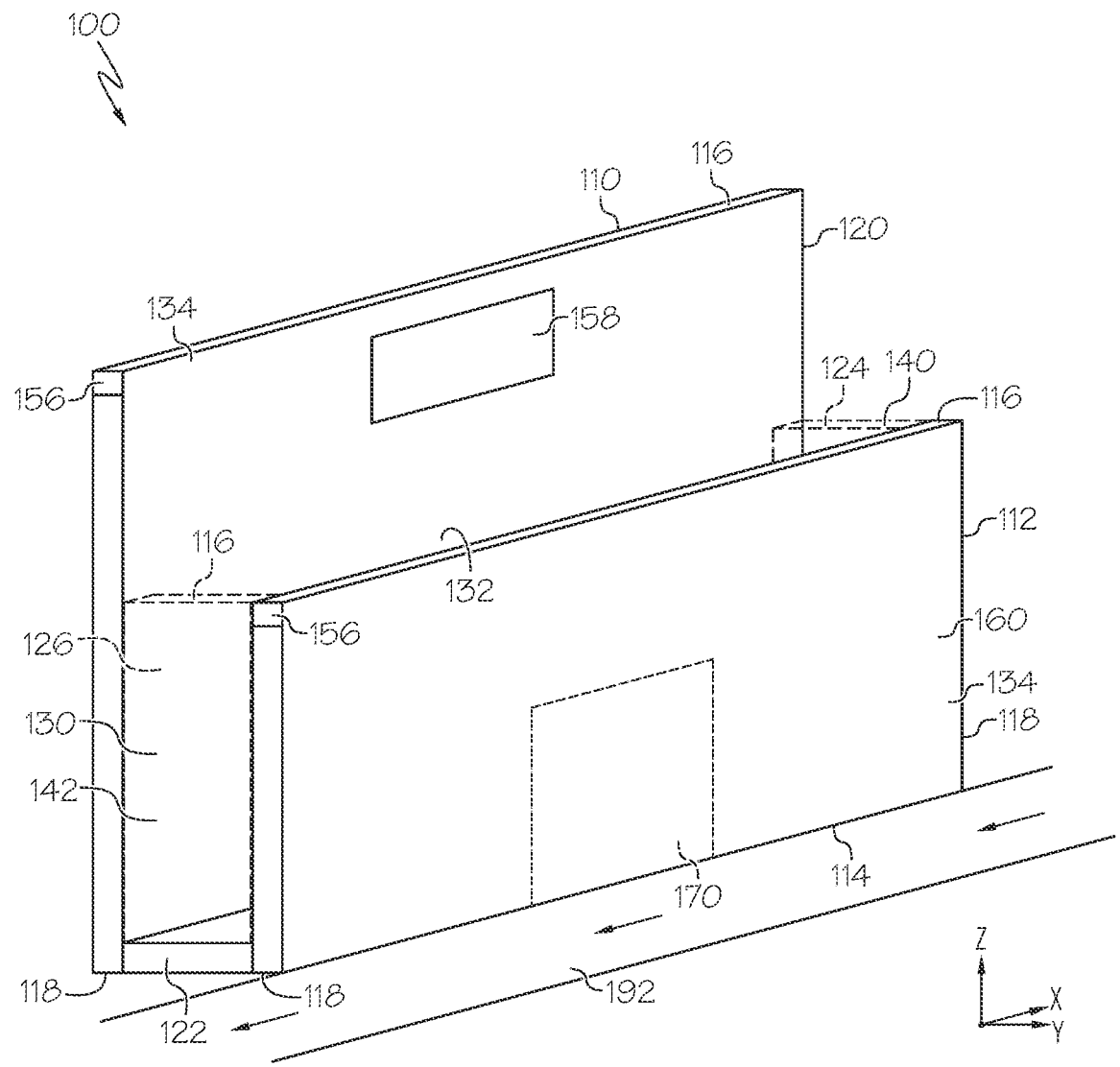
FIG. 1 is a perspective view of an embodiment of the disclosure.

The present invention relates to systems and methods for using RFID technology to identify products, and more specifically, to systems and methods that enable faster identification of multiple products.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, an introduction provides the reader with a general understanding of some exemplary embodiments of the disclosure. Next, specific details of various exemplary embodiments are provided to give an understanding of some specific aspects of the disclosure. Finally, a description is provided of exemplary computer systems capable of performing operations described in this disclosure.

1. Introduction

This disclosure includes systems and methods associated with identification of products, such as for frictionless or faster checkout systems for purchasing goods, produce, or services. For example, systems and methods disclosed here may be used for purchasing groceries, cosmetics, tools, hardware, electronics, clothing, and other items. In some embodiments, items to be purchased may be loosely placed in a bag while shopping and carried out through an identification system that rapidly identifies all of the items within the bag. Feedback regarding the identification and transaction may be provided to a user through one or more of a display screen, indicator lights, and auditory tones. The system can then process the transaction and allow the user to continue walking out of a store or other facility.

Various embodiments disclosed here are intended to allow projection of RF energy within an RFID system while preventing errant and unintended reads of nearby transponders. For example, multiple embodiments enable a user to pass a bag or container once through a read zone to achieve identification of all contained transponders in a single movement. As a result of the loose placement of products within the bag, RFID transponders associated with the products within the bag may have random and/or different orientations and positions. This may facilitate easier RFID transponder activation. For this reason, the embodiments disclosed here have advantages in improved effectiveness and/ or reduced cost based on the specific shape of the structures disclosed as well as the use of one or more antennas, readers, absorbers, and reflectors.

2. Specific Details of Various Embodiments

2.1 Overview

In the exemplary embodiment of FIGS. 1-6D and 9-11, an RFID system 100 can be used to facilitate frictionless or faster shopping experiences. A user 190 can walk along a walkway 192 next to the RFID system 100 while carrying a suspended package 180 (see FIG. 3) and moving the suspended package 180 through the RFID system 100. The RFID system 100 may read multiple RFID transponders 182 within the package 180 and process a transaction, such as purchasing items that are contained within the suspended package 180. In some embodiments, the user 190 may stop to interact with input devices 154 or output devices. In other embodiments, the user 190 may simply continue walking on the walkway 192 without stopping while a purchase transaction for all products associated with the package 180 is processed.

2.2 Components of Exemplary Systems

In various embodiments, the RFID system 100 includes a compartment 110 having a first wall 112, a second wall 120, and a base 122 that together define a cavity 130 (e.g., a slot), a channel 132, a first lateral opening 140, and a second lateral opening 142. In some embodiments, the RFID system 100 may further include one or more of a third wall 124, a fourth wall 126, and additional walls. (See FIGS. 5a through 5j). Each of the first wall 112, the second wall 120, the third wall 124, and the fourth wall 126 may include a lower edge 114, an upper edge 116, lateral edges 118, and surfaces 134. The base 122 may include lateral edges 118 and surfaces 134. In some embodiments, the compartment 110 further includes one or more protrusions 186 (see FIGS. 4a through 4c) that extend from one or more of the first wall 112, the second wall 120, the third wall 124, and the fourth wall 126.

Figure 2:
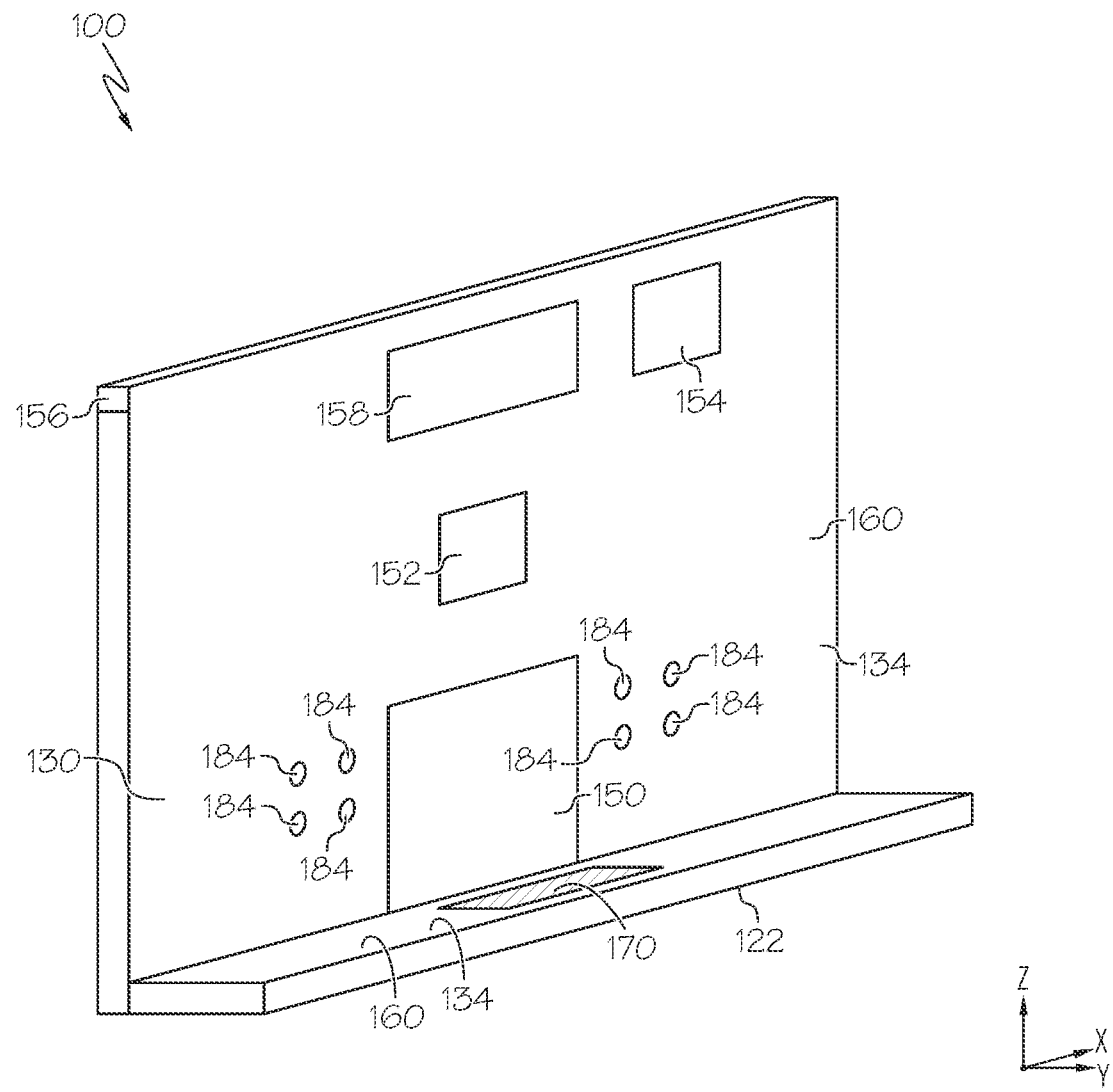
FIG. 2 is a cutaway view of the embodiment shown in FIG. 1.

In the embodiment of FIGS. 1 and 2, the RFID system 100 includes a display 158, the input device 154, and indicator lights 156. In various embodiments, a plurality of the display 158, the input device 154, and the indicator lights 156 may be included on either a part of the RFID system 100, mounted to a wall or other structure near or within line-of-sight to the RFID system 100, or may be part of a mobile device such as a smartphone, tablet, or laptop. The mobile device may include a computer system 200, described below in greater detail in connection with FIG. 7. Additional examples of input devices 154 may include the input device 212 and cursor control device 214 discussed below in connection with FIG. 7.

In addition, the devices may be of any appropriate size. For example, multiple displays 158 may be included on the second wall 120 and may range in size from 2 inches to 100 inches diagonally. Additional displays 158 may be included on locations such as one or more of the base 122, the first wall 112, the third wall 124, and the fourth wall 126. The display 158 may be used to provide transaction information or advertising relating to the transaction or the user 190.

The indicator lights 156 may be used to let users 190 know that the system is ready for operation, such as with a green light. The indicator lights 156 may also indicate that there is a problem with the RFID system 100 using a red light.

In some embodiments, the first wall 112 is between 30 and 40 inches high, with some being up to approximately 36 inches high (e.g., as measured along the Z-axis). In some embodiments, the second wall is between 40 and 56 inches high, with some being up to approximately 48 inches high. In some embodiments the cavity is between 1 and 24 inches wide, between 6 and 18 inches wide, between 9 and 15 inches wide, and between 11 and 13 inches wide (e.g., as measured along the Y-axis). In some embodiments, the cavity is up to approximately 12 inches wide. In some embodiments, the first wall 112, the second wall 120, and the cavity 130 are between 24 and 60 inches long, between 36 and 56 inches long, between 44 and 52 inches long, or up to approximately 48 inches long (e.g., as measured along the X-axis).

The first wall 112 may be sufficiently narrow to allow a user 190 to stand on one side while suspending a package 180 on the other side of the wall by allowing their arm to hang naturally at their side. The first wall may be between 0.5 inches and 4 inches wide.

The input device 154 may include one or more of a touchscreen, a card reader, a camera for image recognition or security recordings, a keypad, a touchpad, a Bluetooth transceiver, an NFC reader, or other input devices. The input device may be used to accept payment, to identify the user 190, to associate the transaction with a user account, or for any other purposes associated with shopping.

In the embodiment of FIGS. 1 and 2, the cavity 130 is defined by the surfaces of the first wall 112, the second wall 120, and the base 122. In addition, the cavity 130 extends between the first lateral opening 140 and the second lateral opening 142, and the cavity 130 extends beneath the channel 132. In some embodiments, the RFID system 100 does not include a base 122, and the cavity 130 is defined by the first wall 112 and the second wall 120. The cavity 130 is sized, shaped, and configured to permit a suspended package 180 to be moved through the cavity 130, such as along a first lateral direction (e.g., an X-axis). The suspended package 180, for example, may be a bag, basket, box, or other container.

In various embodiments, the cavity 130 and/or channel 132 may have a variety of shapes and configurations, and may be curved, straight, or include some combination of shapes and orientations. The cavity 130 may thus be configured to guide or bias movement of a suspended package 180 along different paths or directions. Exemplary embodiments may be seen in FIGS. 5a through 5j and will be discussed in greater detail below.

The channel 132 is an opening defined by the first wall 112 and the second wall 120 and that permits access to the cavity 130. The channel 132 may be defined as the uppermost opening or the narrowest upper opening into the cavity 130 between the first wall 112 and the second wall 120. The channel 132 is in fluid communication with the cavity 130. As shown, the channel 132 opens upward (e.g., as defined by the Z-axis), but it may have other orientations in various embodiments. The channel 132 extends laterally along the first direction (e.g., the X-axis), and is configured to guide lateral movement of a support for a suspended package, such as a bag, basket, or box for a product. In operation, the support may simply be a user's arm and hand that holds the handles of the package, such as a bag or basket. Alternatively, the support may include the handles or straps of a bag, basket, or other package, or may include the structure of a package or product itself. For example, an elongated product such as a mop may be moved through the cavity 130 while extending partially out of the RFID system 100 through the channel 132.

The first lateral opening 140 and the second lateral opening 142 are defined by corresponding lateral edges 118 of the first wall 112 and the second wall 120. Where a base 122 is included as part of the RFID system 100, the first lateral opening 140 and the second lateral opening may further be defined by the corresponding lateral edges of the base 122. Additional lateral openings may be formed between one or more of the first wall 112, the second wall 120, the third wall 124, and the fourth wall 126.

Although the embodiment of FIG. 1 has been described in connection with a user continuously carrying a suspended package, various embodiments of the RFID system 100 may allow the user 190 to perform one or more of carrying, dragging, swinging, and tossing the suspended package through the cavity 130. Various embodiments may also allow the user 190 to intermittently rest the suspended package on the floor of the cavity 130.

The channel 132 may be defined by the first wall 112 and the second wall 120 to be the same size, wider, or narrower than the width of the cavity 130. The channel 132 may also be shaped by other structures, such as the third wall 124 and the fourth wall 126. Additional exemplary embodiments may be seen in FIGS. 5a through 5j and 5a through 5d and will be described in greater detail below in connection with the figures.

A narrower channel 132 may help reduce emission of signals from the RFID system 100. Narrower channels 132 may also help block entrance of stray RFID tag signals into the RFID system 100. On the other hand, wider channels 132 may allow for greater ease of insertion and removal of suspended packages 180 into and out of the RFID system 100, and may permit vertical insertion and removal of packages 180 into and from the cavity 130 (e.g., along the Z-axis). In addition, combination of sizes and use of different shapes for the channel 132 may help guide the movement of suspended packages 180 for different purposes (see FIGS. 5a through 5j and 5a through 5d).

As shown in FIGS. 1 and 2, the RFID system 100 further includes at least one RFID antenna 150, at least one RFID reader 152, and at least one sensor 184. The RFID system 100 may further include one or more reflectors 170 and absorbers 160.

The RFID antenna 150 is configured to energize or interrogate at least one RFID transponder 182, such as an RFID tag or inlay (e.g., a non-NFC tag, an NFC tag). In some embodiments, the RFID antenna 150 interrogation and RFID reader are triggered based on detection of a package 180 or RFID transponder 182 by one or more of the sensors 184. As shown in FIGS. 1 and 2, an RFID antenna 150 is mounted on the second wall 120. In other embodiments, the RFID antenna 150 may be mounted on one or more of the first wall 112, the second wall 120, the third wall 124, the fourth wall 126, and the base 122. For example, in various embodiments, a single RFID antenna 150 may be mounted on the base 122. In other embodiments, RFID antennas 150 may be mounted on the base 122, the third wall 124, and the first wall 112.

In some embodiments, the antenna is a single four port antenna that occupies a space between 4 inches and 40 inches square, between 10 inches and 35 inches square, between 16 inches and 32 inches square, between 24 inches and 30 inches square, and up to approximately 28 inches square. The antenna 150 may be bordered on its lateral and upper edges by 1, 2, 4, 8, or 12 or more inches of wall surface that may incorporate an absorber 160. In other embodiments, the antenna 150 may be of larger or smaller dimensions. The antenna may have GPIO (general input and output) capability, ability to communicate via serial or Ethernet connections, ability to operate lights, and/or ability to control sound emitting devices.

As shown in FIGS. 1 and 2, the RFID reader 152 is mounted above the antenna 150 on the second wall 120. The RFID reader 152 is spaced apart from the antenna 150 by a wall section having an absorber 160. In other embodiments, the RFID reader 152 may be mounted on a wall that is opposite or adjacent to the wall that the RFID antenna 150 is mounted on. In other embodiments, multiple RFID readers 152 may be used and mounted on one or more of the first wall 112, the second wall 120, the third wall 124, the fourth wall 126, and the base 122.

Reflectors 170 may be disposed on walls, curtains, doors, flaps, or other objects having surfaces. Alternatively, the walls, curtains, doors, flaps, or other objects may be composed all or in part from the reflectors 170. For example, the reflector 170 of the embodiment in FIGS. 1 and 2 is disposed on, may form, or be encapsulated beneath an interior surface 134 of the first wall 112 facing the RFID antenna 150 and the RFID reader 152. In other embodiments, one or more reflectors may be disposed on one or more of the first wall 112, the second wall 120, the third wall 124, the fourth wall 126, and the base 122. Some examples of materials that may be used to form the reflector 170 include metal components such as sheet metal, metal support structures, and metallic films.

Absorbers 160 may be disposed on walls, curtains, doors, flaps, or other objects having surfaces. Alternatively, the walls, curtains, doors, flaps, or other objects may be composed all or in part from the absorbers 160. For example, the absorbers 160 of the embodiment of FIGS. 1 and 2 are disposed on, may form, or be encapsulated beneath the interior surfaces 134 of the first wall 112 and the second wall 120 on locations not already occupied by RFID antennas 150, RFID readers 152, or other devices. In other embodiments, absorbers 160 may be placed in more limited areas to reduce cost, such as only on areas where direct reflection towards an RFID reader 152 may occur. In other embodiments, absorbers 160 may be placed on additional surfaces and structures to further reduce the likelihood of stray signals being received by the RFID readers 152. One or more absorbers 160 may be placed on one or more of the first wall 112, the second wall 120, the third wall 124, the fourth wall 126, and the base 122. Example materials or structures that may be used to form an absorber 160 include metal hardware cloth, screen, RF fabrics, and/or a Salsbury screen.

2.3 Exemplary Operations

Figure 3:
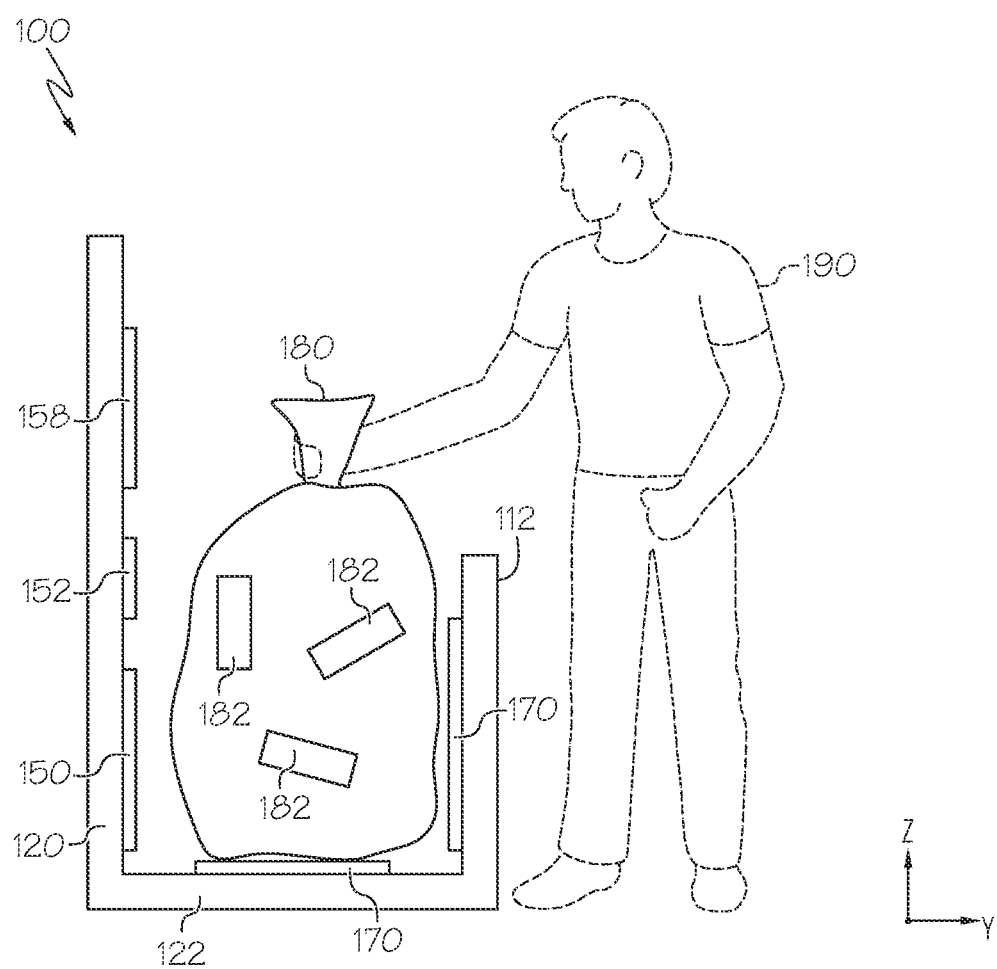
FIG. 3 is a side view illustrating operation of an embodiment of the disclosure.

FIG. 3 is a side view illustrating operation of an embodiment of the disclosure. As part of the transaction operations, the user 190 may be recognized by the RFID system 100 in various ways. For example, the user 190 may be recognized by using cameras and known techniques for performing facial recognition and associated with a particular user account. In other embodiments, a facility may use Bluetooth communication with a user's phone to identify the user 190 and the associated account to be charged. In other embodiments, a user 190 is identified via QR code that the user 190 presents on their phone after registering for an account with the owner of the RFID system 100 or a transaction processing company.

As shown in FIG. 3, a user 190 may walk past the RFID system 100 while carrying a suspended package 180 containing multiple RFID transponders 182 corresponding to multiple products. The items and their corresponding RFID transponders 182 are shown to have various orientations and positions within the package 180.

As shown, the RFID system 100 includes an RFID antenna 150, an RFID reader 152, and a display 158 mounted on the second wall 120. A reflector 170 is mounted on each of the first wall 112 and the base 122. In an example, sensors 184 (not shown) are used to trigger an interrogation signal from the RFID antenna 150 based on detection of the bag, a product, or the user. At least part of the interrogation signal may be reflected off one or more of the reflectors 170 and received by the RFID transponders 182. The RFID transponders 182 then in turn generate a signal (e.g., backscatter) that is received by the RFID antenna 150 and used to identify each of the products in the package 180. For example, the RFID reader 152 may interpret the output from at least one of the RFID transponders 182.

The user may be provided with information from the RFID system 100. For example, the display 158 may be used to provide the user 190 with a list of the identified products and the amount to be charged to the user 190. The display 158 may also be used to present the user 190 with advertisements based on information known about the user 190 and the transaction.

2.4 Additional Exemplary Embodiments

Figure 4A:
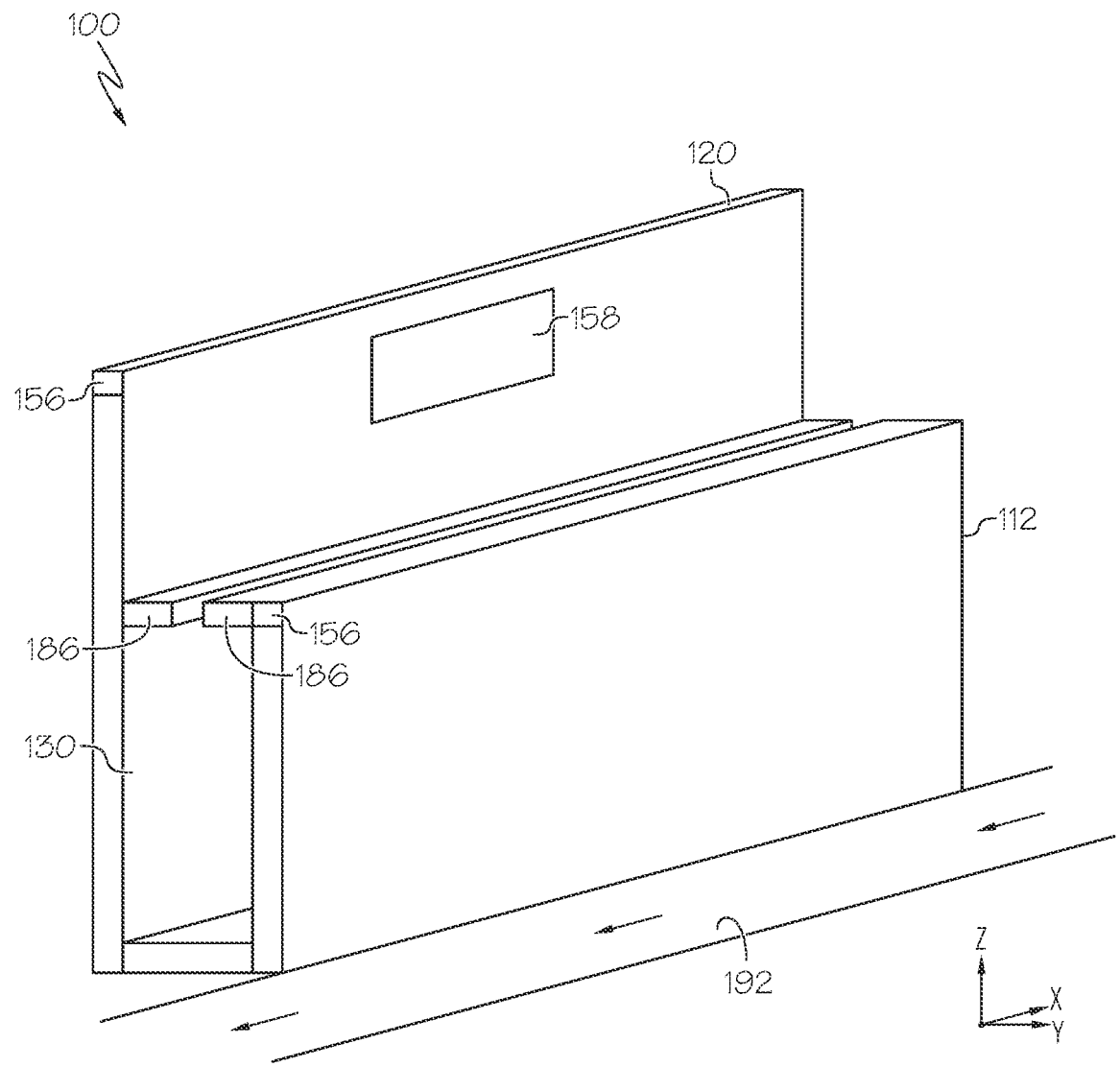
FIGS. 4*a*-4*c* include multiple views of an embodiment of the disclosure.
Figure 4B:
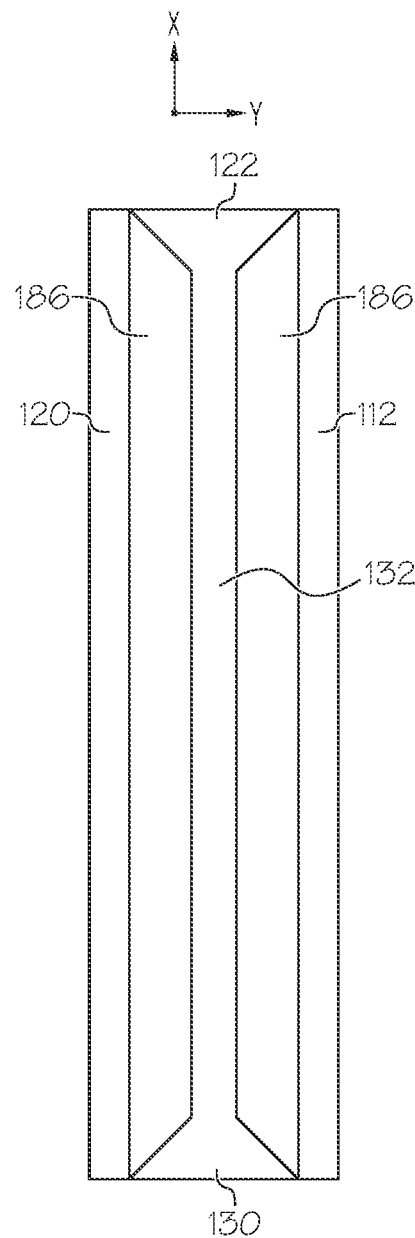
Figure 4C:
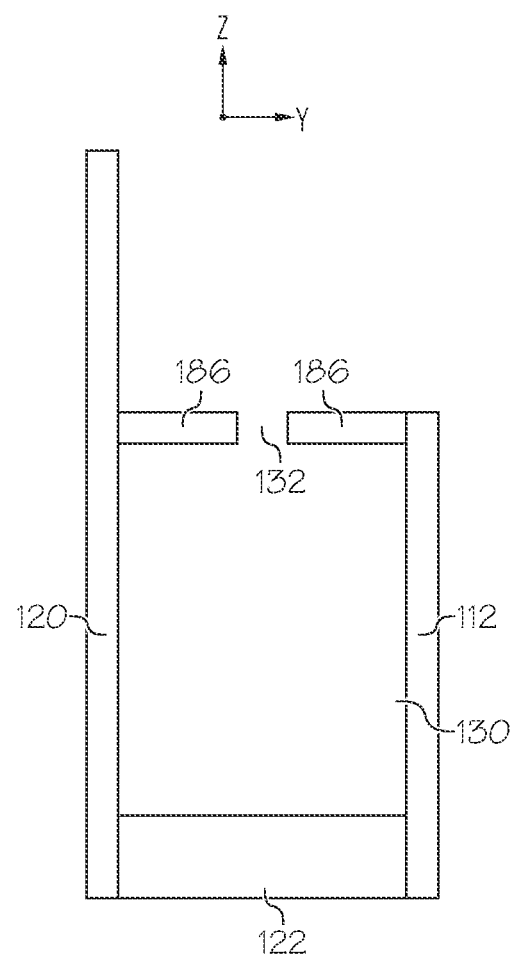

FIGS. 4a through 4c include multiple views of an embodiment of the disclosure that includes protrusions 186 extending toward each other from each of the first wall 112 and the second wall 120. FIGS. 4a, 4b, and 4c include a perspective, top, and side view, respectively. The protrusions 186 of FIGS. 4a through 4c may allow passage of a user's arm or bag handles as a supported package 180 is carried down the length of the compartment 110. These protrusions 186 may also help shield the compartment 110 and the RFID antenna 150 from emitting or receiving stray RFID signals.

As shown, each of the protrusions 186 extend laterally along the first direction (e.g. the X-axis) and extend from their respective walls laterally along the second direction (e.g., the Y-axis) to form the channel 132. Each of the protrusions 186 are shown as being substantially the same length, thickness, and form, but other embodiments may use unequal, non-symmetric, and/or non-corresponding protrusions 186 having varying forms, including with respect to straight or curved sections as well as thickness and sharpness.

As illustrated in FIGS. 4a-4c, the protrusions 186 are formed as ledges or fins, but in other embodiments they may be formed as bumps, cloth curtains, sliding or rotating panels, or other structures. In addition, the protrusions 186 may be integrally formed as part of one or both of the first wall 112 and the second wall 120, or they may be mounted or otherwise attached to each of the first wall 112 and the second wall 120.

The protrusions 186 may be permanently attached or removeable. In addition, the protrusions 186 may be fixed in position, or they may be moveable. For example, the protrusions 186 may move towards and/or away from the first wall 112 and the second wall 120 along the second lateral direction (e.g., the Y-axis) to facilitate adjustment of the channel 132 width from 0 inches to the full width of the cavity 130. Alternatively, some or all of the protrusions 186 may be rotatable (e.g., around the X or Z axis), such as to facilitate wider bag handles, different user arms, different package widths, or cavity insertion methods.

The protrusions 186 may have a constant width in a middle section that tapers along the first lateral direction to the ends of the protrusions, which may be disposed at the ends of the first wall 112 and/or the second wall 120. The tapering may facilitate insertion and removal of a user's arms or a supported package's 180 bag handles at the beginning or end of the channel 132 and/or the cavity 130.

Figure 5A:
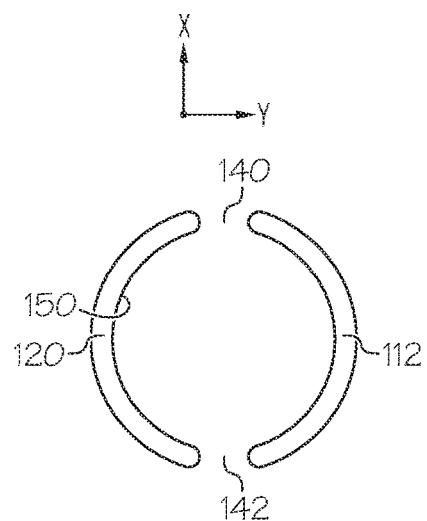
FIGS. 5*a*-5*j* are top views of various embodiments of the disclosure.
Figure 5B:
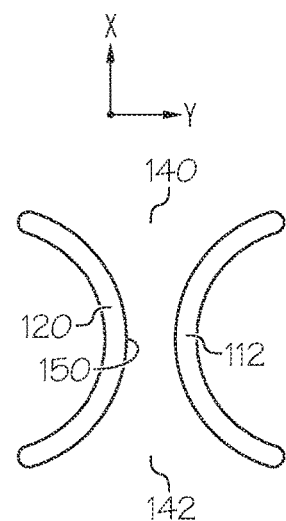

FIG. 5a-5j are top views of various embodiments of the disclosure. For example, FIGS. 5a and 5b illustrate embodiments with concave and convex walls, respectively. The concave walls of FIG. 5a may assist with focusing reflected signals back towards one or more of the RFID antenna 150 and the package 180. The convex walls of FIG. 5b may help to guide the package 180 into the cavity 130 for more rapid product identification.

Figure 5C:
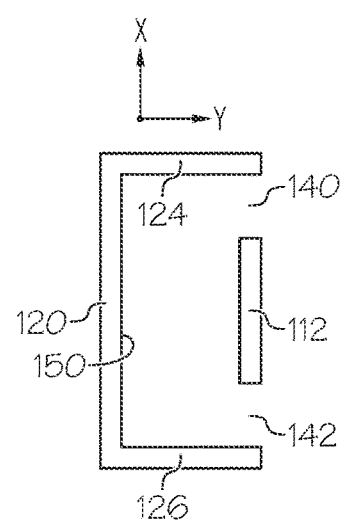

FIG. 5c illustrates an embodiment in which the first lateral opening 140 and the second lateral opening 142 open in the same direction rather than opposite directions. This arrangement may allow the RFID system 100 to better contain signals and to better prevent or reduce external signals from being read by the antenna.

Figure 5D:
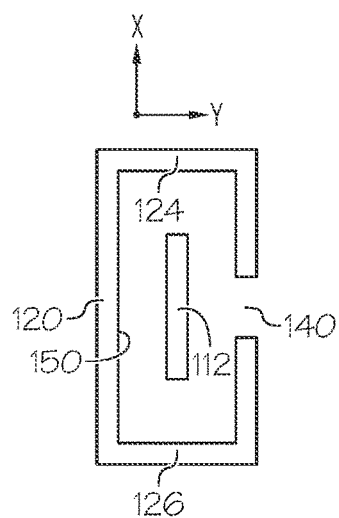

FIG. 5d illustrates an embodiment with a single lateral opening 140 facing the cavity 130 and the antenna 150, but with a first wall 112 disposed inside the cavity 130 acting as a barrier to prevent or reduce signals from moving outside the RFID system 100 or being received by the antenna 150 from outside the RFID system 100.

Figure 5E:
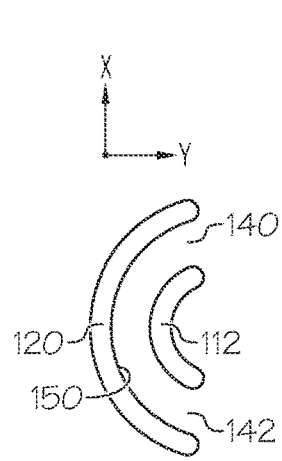
Figure 5F:
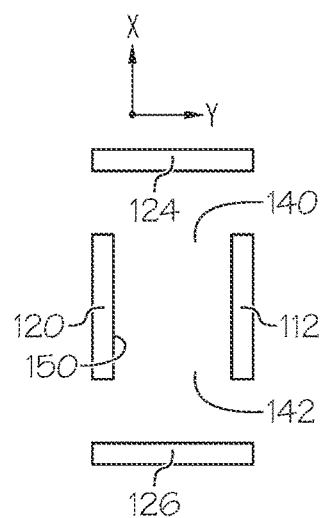
Figure 5G:
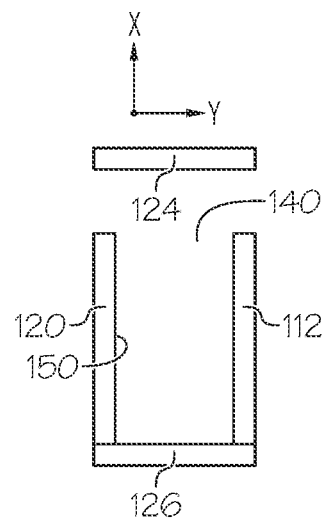
Figure 5H:
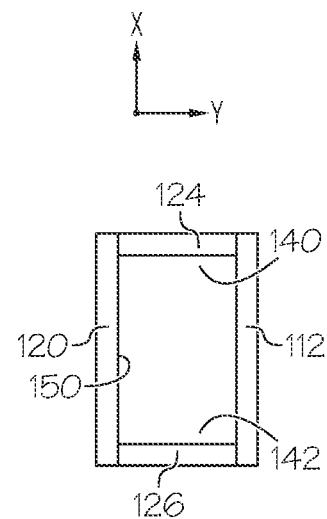

FIG. 5e illustrates an embodiment in which the first wall 112 and the second wall 120 are curved in the same direction to reduce the potential for receiving stray signals by the antenna 150. The curved walls and path of the cavity 130 may also induce rotation in the package 180, which may further improve the likelihood and speed of reading all RFID tags contained in the package 180.

Figure 5I:
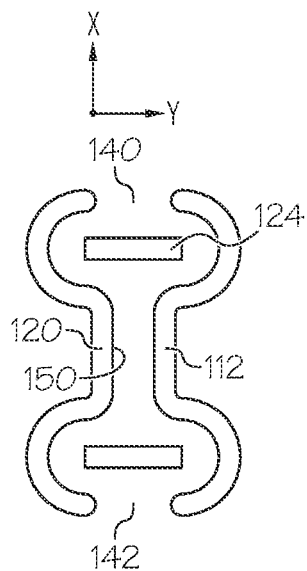

FIGS. 5f, 5g, 5h, and 5i each include a third wall 124 and a fourth wall 126 placed outside the first lateral opening 140 and the second lateral opening 126. These may help prevent stray signals from being received by the antenna 150. One or more of the third wall 124 and the fourth wall 126 may be separated from or abutted against the first wall 112 and the second wall 120. The third wall 124 and the fourth wall 126 may also be placed within the cavity 130 as shown in FIG. 5i. In each embodiment, the third wall 124 and the fourth wall 126 may be solid and immovable, moveable, and/or formed from a curtain or other flexible material. Being moveable may mean the walls act as a single door, a double door, a sliding door, or are otherwise moveable to allow access to the cavity 130.

Figure 5J:
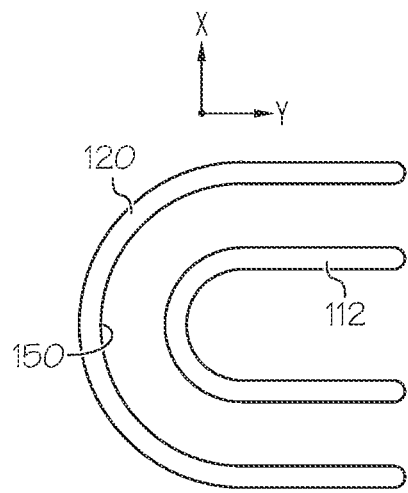
Figure 6A:
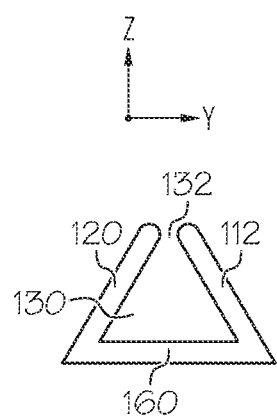
FIGS. 6*a*-6*d* are side views of various embodiments of the disclosure.
Figure 6B:
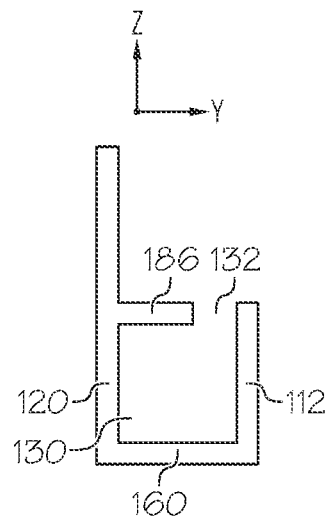
Figure 6C:
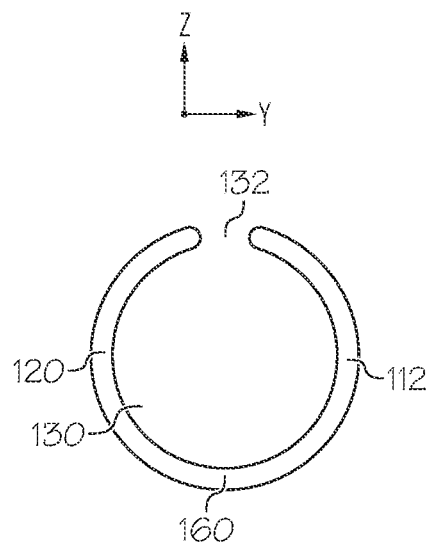
Figure 6D:
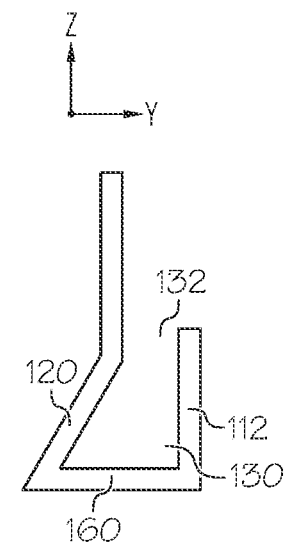

FIG. 5j illustrates an embodiment similar to the embodiment of FIG. 5e, but with extended walls that further reduce the likelihood that stray signals will be received by the antenna 150.

FIG. 6a-6d are side views of various embodiments of the disclosure that demonstrate how the walls of the RFID system 100 may have different shapes, angles, and orientation. These various structures may help to prevent stray signals from being read, may help keep the package 180 in a preferred location within the cavity 130, and/or may help focus signals in a preferred manner. For example, the interiors of the embodiments of FIGS. 6a and 6d include a cavity 130 with a triangular cross section. The interior of FIGS. 6b and 6c have a rectangular and a rounded or oval cross-section, respectively.

2.5 Exemplary Computer and Software Systems

Figure 7:
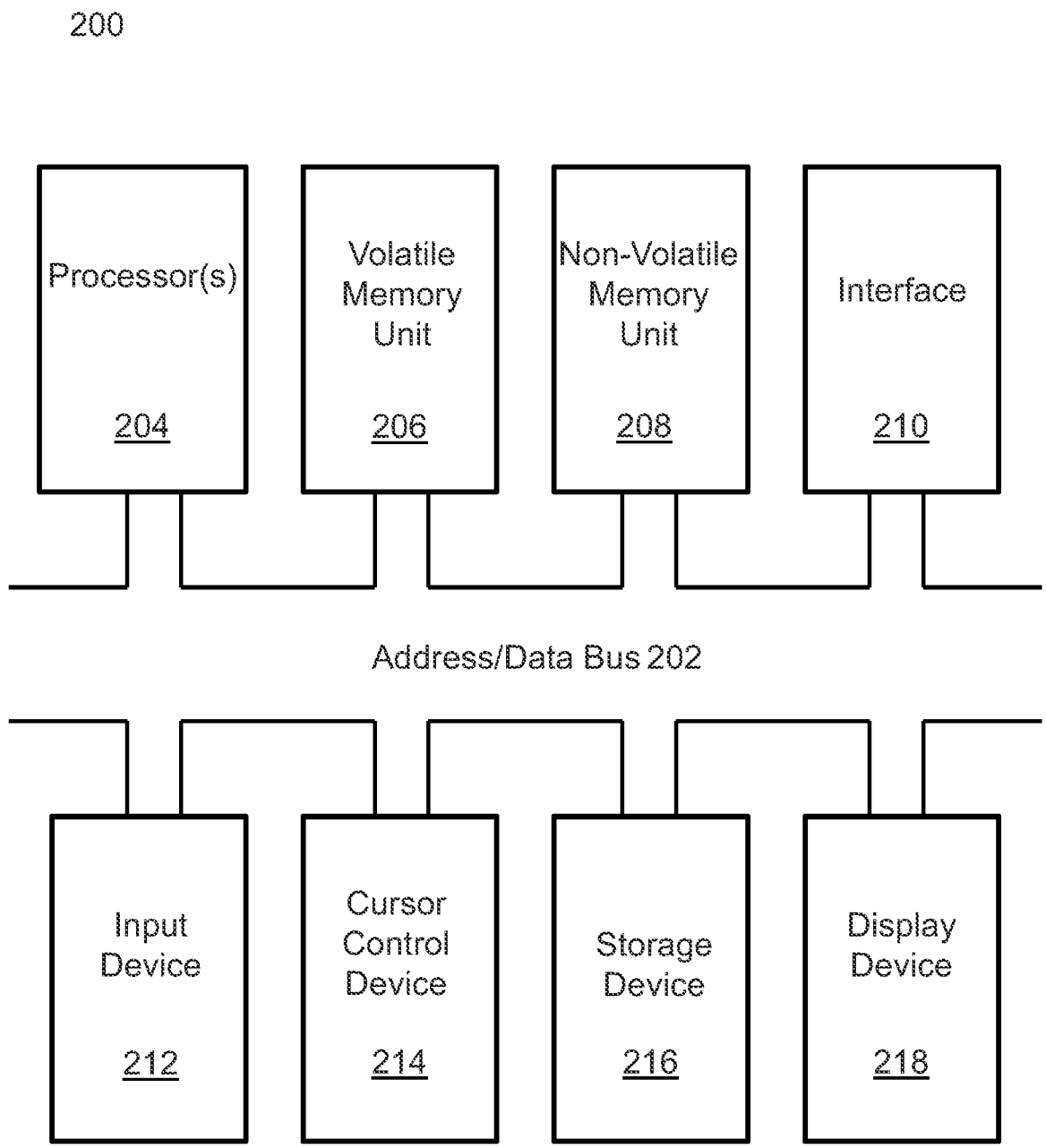
FIG. 7 is a block diagram depicting components of a system according to various embodiments of the present disclosure.

A block diagram depicting an example of a system (i.e., computer system 200) that may be used to process signals and/or perform operations described in this disclosure is provided in FIG. 7. The computer system 200 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 200. When executed, the instructions cause the computer system 200 to perform specific actions and exhibit specific behavior, such as described herein.

The computer system 200 may include an address/data bus 202 that is configured to communicate information. Additionally, one or more data processing units, such as a processor 204 (or processors), are coupled with the address/data bus 202. The processor 204 is configured to process information and instructions. In an aspect, the processor 204 is a microprocessor. Alternatively, the processor 204 may be a different type of processor such as a parallel processor, application-specific integrated circuit (ASIC), programmable logic array (PLA), complex programmable logic device (CPLD), or a field programmable gate array (FPGA).

The computer system 200 is configured to utilize one or more data storage units. The computer system 200 may include a volatile memory unit 206 (e.g., random access memory ("RAM"), static RAM, dynamic RAM, etc.) coupled with the address/data bus 202, wherein a volatile memory unit 206 is configured to store information and instructions for the processor 204. The computer system 200 further may include a non-volatile memory unit 208 (e.g., read-only memory ("ROM"), programmable ROM ("PROM"), erasable programmable ROM ("EPROM"), electrically erasable programmable ROM "EEPROM"), flash memory, etc.) coupled with the address/data bus 202, wherein the non-volatile memory unit 208 is configured to store static information and instructions for the processor 204. Alternatively, the computer system 200 may execute instructions retrieved from an online data storage unit such as in "Cloud" computing. In an aspect, the computer system 200 also may include one or more interfaces, such as an interface 210, coupled with the address/data bus 202. The one or more interfaces are configured to enable the computer system 200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 200 may include an input device 212 coupled with the address/data bus 202, wherein the input device 212 is configured to communicate information and command selections to the processor 100. In accordance with one aspect, the input device 212 is an alphanumeric input device, such as a keyboard, that may include alphanumeric and/or function keys. Alternatively, the input device 212 may be an input device other than an alphanumeric input device. In an aspect, the computer system 200 may include a cursor control device 214 coupled with the address/data bus 202, wherein the cursor control device 214 is configured to communicate user input information and/or command selections to the processor 100. In an aspect, the cursor control device 214 is implemented using a device such as a mouse, a track-ball, a track-pad, an optical tracking device, or a touch screen. The foregoing notwithstanding, in an aspect, the cursor control device 214 is directed and/or activated via input from the input device 212, such as in response to the use of special keys and key sequence commands associated with the input device 212. In an alternative aspect, the cursor control device 214 is configured to be directed or guided by voice commands.

In an aspect, the computer system 200 further may include one or more optional computer usable data storage devices, such as a storage device 216, coupled with the address/data bus 202. The storage device 216 is configured to store information and/or computer executable instructions. In one aspect, the storage device 216 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 218 is coupled with the address/data bus 202, wherein the display device 218 is configured to display video and/or graphics. In an aspect, the display device 218 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 200 presented herein is an example computing environment in accordance with an aspect. However, the non-limiting example of the computer system 200 is not strictly limited to being a computer system. For example, an aspect provides that the computer system 200 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 8:
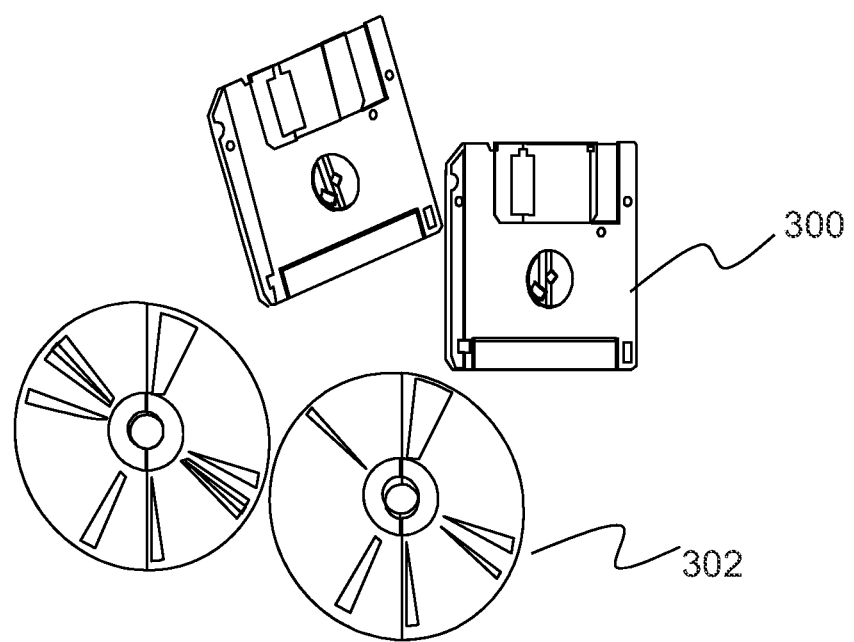
FIG. 8 is an illustration of a computer program product embodying an aspect of some embodiments of the present disclosure.

An illustrative diagram of a computer program product (i.e., storage device) is depicted in FIG. 8. The computer program product is depicted as floppy disk 300 or an optical disk 302 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

2.6 Additional Exemplary Embodiments

Figure 9:
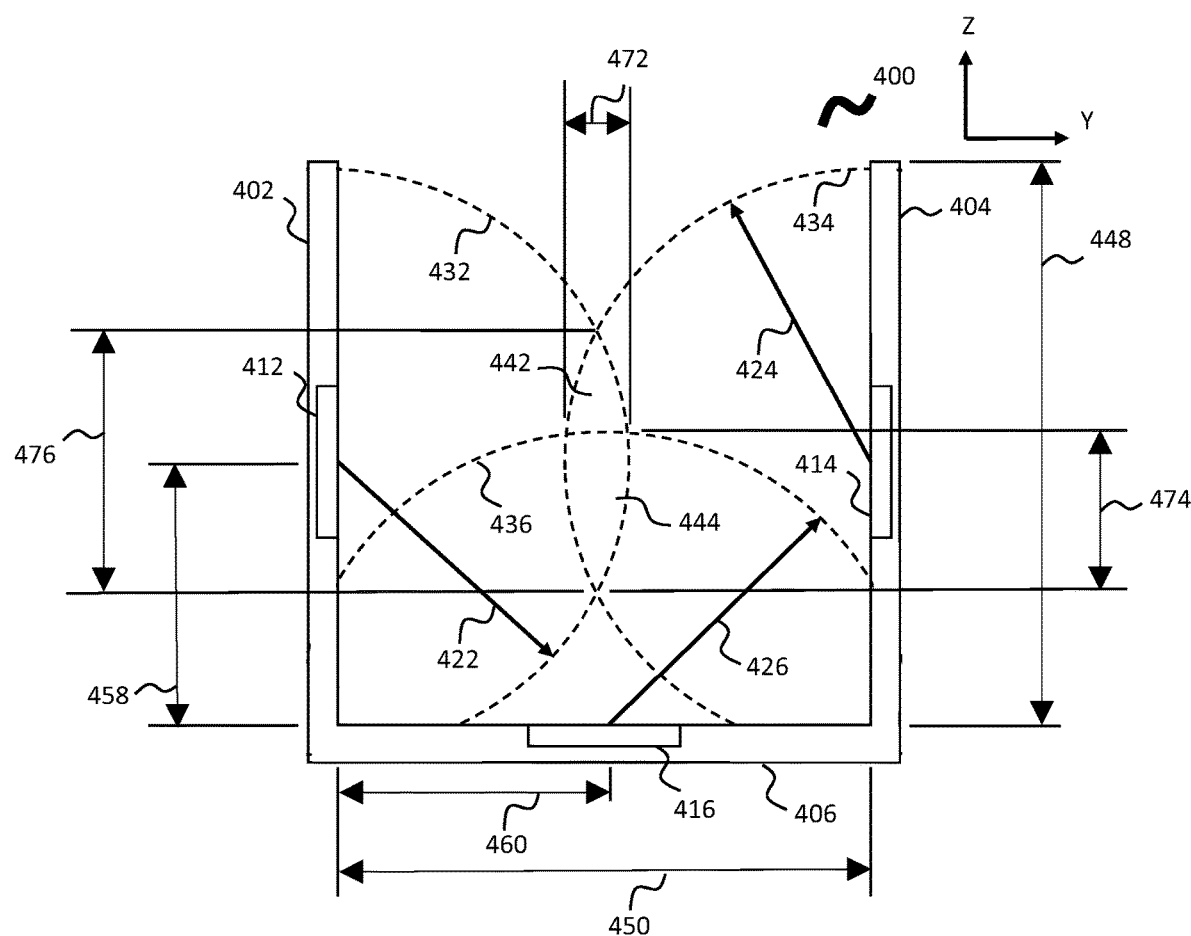
FIG. 9 is a front cutaway view according to various embodiments of the present disclosure.
Figure 10:
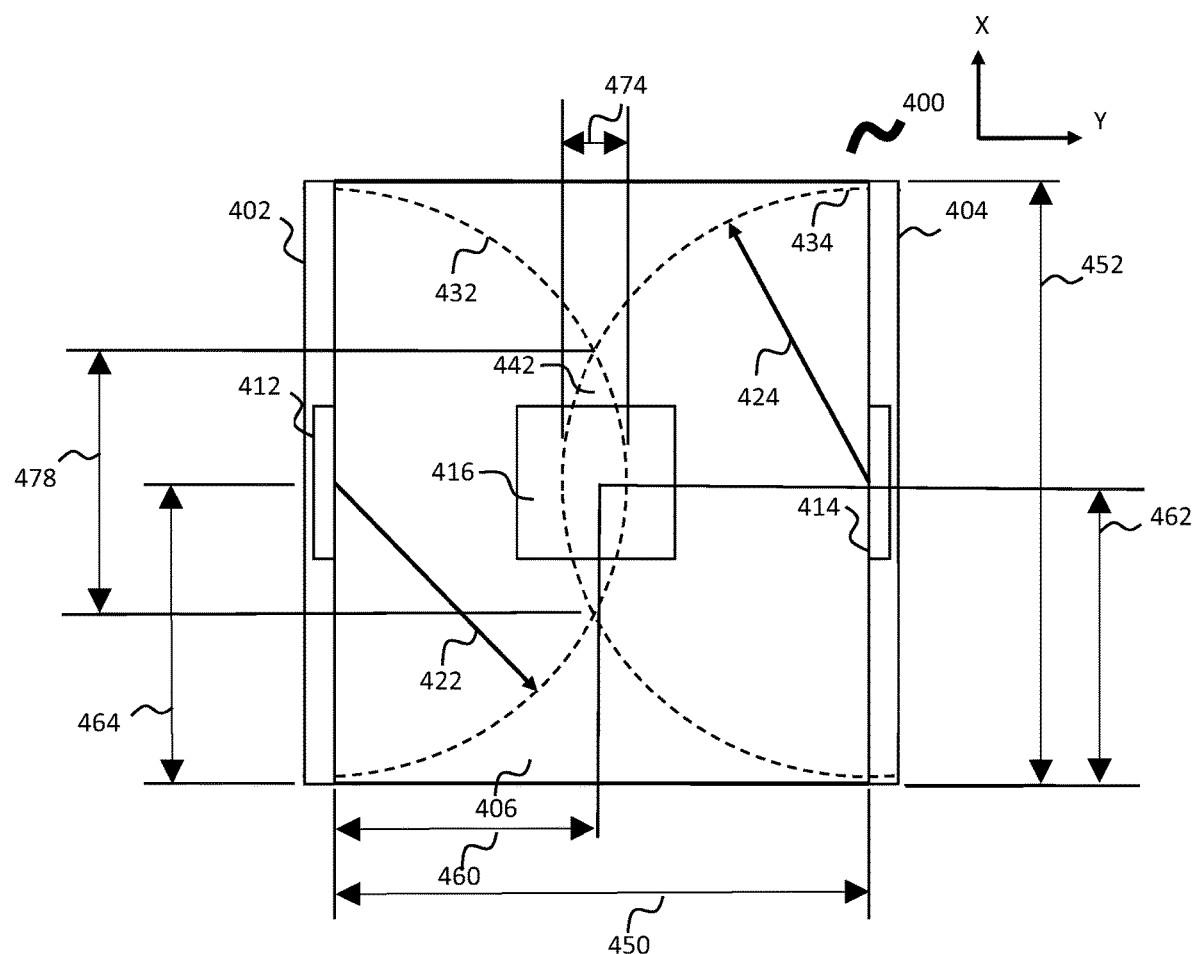
FIG. 10 is a plan view according to various embodiments of the present disclosure.
Figure 11:
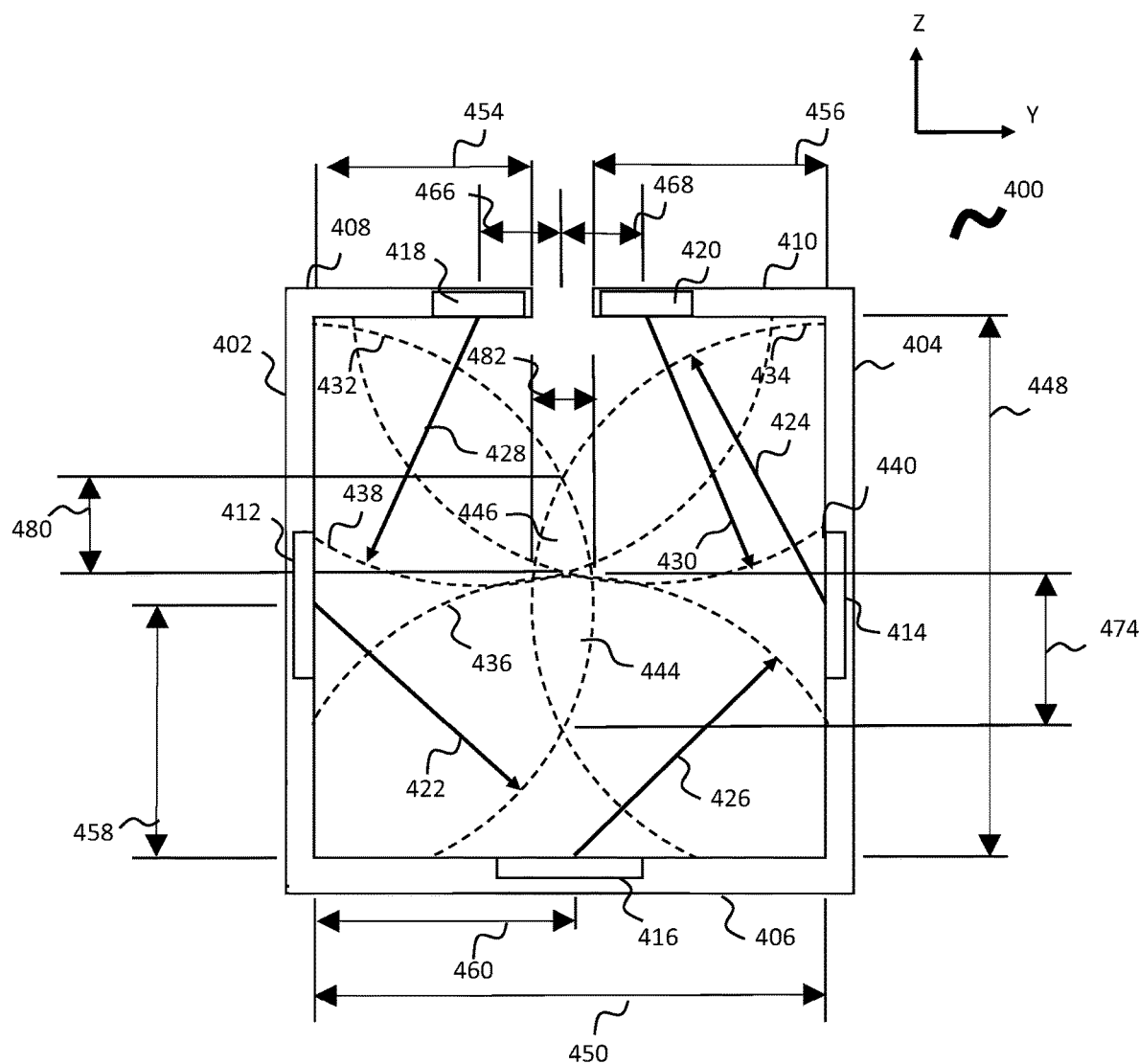
FIG. 11 is a front cutaway view according to various embodiments of the present disclosure.

FIGS. 9-11 illustrate additional embodiments of RFID systems 400, which in some embodiments are NFC-only systems. As shown in FIGS. 9-10, an RFID system may include a first wall 402, a second wall 404, and a third wall 406. The first wall 402 may include a first RFID device 412, the second wall 404 may include a second RFID device 414, and the third wall 406 may include a third RFID device 416. The first RFID device 412, the second RFID device 414, and the third RFID device 416 may have, respectively, a first range 422, a second range 424, and a third range 426, and respectively, a first field 432, a second field 434, and a third field 436.

The first field 432 and the second field 434 may overlap to create a first overlap 442 having a first width 472 as measured along a Y-axis direction, a third width 476 as measured along a Z-axis direction, and a fourth width 478 as measured along an X-axis direction. The first field 432, the second field 434, and the third field 436 may overlap to form a second overlap 444 having a second width 474 as measured along a Z-axis direction.

The inner surface of the first wall 402, the second wall 404, and the third wall 406 may define a cavity 484. In some embodiments, a fourth wall 408 and a fifth wall 410 may have surfaces that help to define the cavity 484. The inner surface the first wall 402 and/or the second wall 404 may have a first length 448 as measured along the Z-axis. The inner surface of the third wall 406 may have a second length 450 as measured along the Y-axis, and a third length 452 as measured along the X-axis. The inner surface of the fourth wall 408 and the fifth wall 410 may have a fourth length 454 and a fifth length 456, respectively.

The first RFID device 412 and/or the second RFID device 414 may be positioned at a first distance 458 from an inner surface of the third wall 406 as measured along the Z-axis and a fourth distance 464 from a front edge of the third wall 406 as measured along the X-axis. The third RFID device 416 may be positioned at a second distance 460 from an inner surface of the first wall 402 as measured along the Y-axis, and at a third distance 462 from a front edge of the third wall 406 as measured along the X-axis.

As shown in FIG. 11, an RFID system may include a fourth wall 408 and a fifth wall 410 extending towards each other along the Y-axis direction from the first wall 402 and the second wall, 404, respectively. The fourth wall 408 may include a fourth RFID device 418, and the fifth wall 412 may include a fifth RFID device 420. The fourth RFID device 418 may have a fourth range 428 and a corresponding fourth field 438, and the fifth RFID device 420 may have a fifth range 430 and a fifth field 440.

The first field 432, the second field 434, the fourth field 438, and the fifth field 440 may overlap to form a third overlap 446 having a fifth width 480 as measured along the Z-axis and a sixth width 482 as measured along the Y-axis.

The fourth RFID device 414 and the fifth RFID device 414 may be spaced apart from a midpoint of the cavity 484 as measured along the Y-axis by a fifth distance 466 and a sixth distance 468, respectively.

One, some, or each of the first RFID device 412, the second RFID device 414, the third RFID device 414, the fourth RFID device 414, and the fifth RFID device 414 may be an NFC device rather than a longer range RFID device.

In various embodiments, the RFID system 400 may use one or more NFC devices that are mounted to and/or embedded within one or more of the first wall 402, the second wall 404, the third wall 406, the fourth wall 408, and/or the fifth wall 410. The cavity 484 may be sized and shaped to keep packages that are placed within and/or slid through the cavity 484 within close proximity to the one or more NFC devices. For example, in some embodiments, NFC devices may operate at a preferred range between a lower threshold and a larger threshold. The lower threshold may be between 0.1 and 2 cm, 0.1 and 1.5 cm, 0.1 and 1 cm, or 0.1 and 0.5 cm. The larger threshold may be between 0.5 cm and 25 cm, 1 cm and 20 cm, 5 cm and 15 cm, between 8 cm and 12 cm, or between 9 and 11 cm. For example, the preferred range may be between 0.1 and 20 cm, 0.1 and 15 cm, 0.1 and 10 cm, or 0.1 and 5 cm. In some embodiments, one or more of the first length 448, the second length 450, the third length 452 may be configured to be sized in accordance with greater than or equal to twice the length of the larger threshold, such as being at least 1 cm, 5 cm, 10 cm, 15 cm, 20 cm, 25 cm, 30 cm, 40 cm, or larger.

The combined lengths of the channel 486, the fourth wall 408, and the fifth wall 410 as measured along the Y-axis may be greater than, equal to, or less than the length of the inner surface of the third wall 406. In some embodiments, the channel 486 may provide a narrower aperture than the cavity 484 that can help guide a package through the shorter range fields of one or more NFC devices. In some embodiments, the fields of the one or more NFC devices may be sized to remain within the cavity 484.

In various embodiments, one or more of the first wall 402, the second wall 404, the third wall 406, the fourth wall 408, and the fifth wall 410 may be sized, shaped, and/or positioned to confine a shopping bag to an area where it will encounter at least 1, 2, 3, 4, 5 or more separate fields (e.g., the first field 432, the second field 434, the third field 436, the fourth field 438, the fifth field 440). In various embodiments, the channel 486 defined by the fourth wall 408 and the fifth wall 410 may be positioned to guide a center of a package or bag being suspended by a user 190's hand (e.g., using bag or package straps and/or a flexible part of the bag) to be guided through 1, 2, 3, 4, or 5 fields generated by different NFC devices.

In various embodiments, the RFID system may have a cavity 484 that is sized to permit passage of a bag that is 4, 6, 8, 10, or 12 inches wide. In other words, the cavity 484 width along the Y-axis direction may be within 0.5, 1, 1.5, 2, 2.5, or 3 inches of the maximum width of the desired shopping bag or other package to be read. In various embodiments, the channel 486 may have a width that is up to 1, 2, 3, 4, 5, 6, 7, 8, 9, or 10 inches wide. Other embodiments may have wider or shorter widths.

In some embodiments, one, some, or all of the RFID devices (e.g., the first RFID device 412, the second RFID device 414, the third RFID device 416, the fourth RFID device 418, the fifth RFID device 420) may have dimensions of up to 3, 4, 5, 6, 7, 8, or 9 inches as a greatest dimension, which may correspond to the outer dimensions for a coil or loop of conductor (e.g., an antenna) that may be used by the RFID device (e.g., an NFC device, a non-NFC device).

In some embodiments, one or more of the RFID devices may be configured to suppress communication by transponders that have been successfully read, allowing signals from weaker transponders to be read when there are multiple transponders within a package or bag.

In various embodiments, each of the RFID devices may represent a set of one or more RFID devices. For example, the first RFID device 412 may represent 1, 2, 3, 4, or more RFID devices (e.g., NFC readers, non-NFC readers).

By using NFC devices, the RFID system 400 may use one or more magnetic fields to couple with NFC antennas for transponders contained within a user's shopping bag. In various embodiments, using NFC devices may dramatically reduce read ranges when compared with other non-NFC devices. However, by using NFC devices, improved performance may be obtained with respect to liquids, metals, powders for packages and/or their contents. For example, cosmetics, beauty products, bottles, cans, or objects filled with one or more of liquids, powders, and/or metals, may cause greater interference with non-NFC tags and readers, but may be more successfully read for purchases or other purposes by NFC devices and/or readers.

Finally, while the present invention has been described in terms of several embodiments, one of ordinary skill in the art will readily recognize that the present invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. An RFID system for product identification, the system comprising:
    a compartment having a first wall and a second wall that extend toward each other and that together define at least part of a cavity and a channel,
    the cavity extending laterally along a first direction and being configured to contain a suspended package and having a first width extending along a second direction,
    the channel extending laterally along the first direction and having a second width extending along the second direction, the channel being in fluid communication with the cavity, the channel being configured to limit movement along the second direction of a support that extends downward through the channel and into the cavity to support the suspended package, the second width of the channel being narrower than the first width of the cavity;
    at least one RFID antenna configured to transmit a signal to be received by the at least one RFID transponder of the suspended package; and
    an RFID reader configured to interpret an output from the at least one RFID transponder disposed in the cavity,
    wherein the width of the channel is less than 0.1524 meters.

2. The system as set forth in claim 1, wherein the first wall comprises a first lower edge that is distal to a first edge, and the second wall comprises a second lower edge that is distal to a second edge, and wherein a base is connected to the first lower edge and the second lower edge.

3. The system as set forth in claim 1, wherein the at least one RFID antenna is an NFC antenna.

4. The system as set forth in claim 1, wherein the first wall and the second wall define a first lateral opening that permits lateral movement of the suspended package between the cavity and space external to the compartment, and wherein the first wall and the second wall define a second lateral opening that permits lateral movement of the suspended package between the cavity and space external to the compartment.

5. The system as set forth in claim 4, wherein the first lateral opening and the second lateral opening are disposed opposite each other.

6. The system as set forth in claim 4, wherein one or more of the first lateral opening and the second lateral opening enable the suspended package to move along a first lateral direction into the cavity.

7. The system as set forth in claim 4, wherein one or more of the first lateral opening and the second lateral opening enable the suspended package to move along a second lateral direction into the cavity.

8. The system as set forth in claim 1, further comprising one or more of:
   a third wall that is separated from the first and second wall and positioned to at least partially block lateral line of sight to the RFID reader from outside the compartment and through the first lateral opening; and
   a fourth wall that is separated from the first and second wall and positioned to at least partially block lateral line of sight to the RFID reader from outside the compartment and through the second lateral opening, and wherein the third wall and the fourth wall are each formed from at least one of a door and a cloth.

9. The system as set forth in claim 1, wherein at least one of the first wall and the second wall is curved.

10. The system as set forth in claim 1, further comprising one or more reflectors disposed within the cavity and facing the RFID antenna and the RFID reader, and wherein one or more of a first reflector is mounted on the first wall and a second reflector is mounted on the second wall.

11. The system as set forth in claim 1, further comprising any one or more of: a sensor configured to trigger operation of at least one of the RFID reader and the RFID antenna; and a display.

12. The system as set forth in claim 1, wherein one or more of: the second wall is taller than the first wall; and the RFID reader and the RFID antenna are mounted in the second wall.

13. The system as set forth in claim 1, wherein each of the first wall and the second wall further comprise a protrusion that extends laterally along a second direction toward the opposite wall, the channel being defined by the pair of protrusions.

14. A method of identifying products using the RFID system of claim 1 comprising a compartment having a first wall and a second wall that together define at least part of a cavity and a channel, comprising:
   receiving a suspended package in the cavity of the compartment of the RFID system;
   using the first wall and the second wall that define the channel, guiding lateral movement of a support that extends downward through the channel and into the cavity to support the suspended package;
   transmitting a signal to be received by at least one RFID transponder of the suspended package using at least one RFID antenna; and
   using an RFID reader, interpreting an output from the at least one RFID transponder disposed in the cavity,
   wherein the cavity extends laterally along a first direction and is configured to contain a suspended package, and wherein the channel extends laterally along the first direction and is in fluid communication with the cavity,
   wherein the width of the channel is less than 0.1524 meters.

15. A method of forming an RFID system for product identification, the method comprising:
   forming a compartment having a first wall and a second wall that together define at least part of a cavity and a channel,
   the cavity extending laterally along a first direction and being configured to contain a suspended package,
   the channel extending laterally along the first direction and being in fluid communication with the cavity, the channel being configured to guide lateral movement of a support that extends downward through the channel and into the cavity to support the suspended package;
   configuring at least one RFID antenna to transmit a signal to be received by the at least one RFID transponder of the suspended package; and
   configuring an RFID reader to interpret an output from the at least one RFID transponder disposed in the cavity,
   wherein the width of the channel is less than 0.1524 meters.

* * * * *